United States Patent
Han et al.

(10) Patent No.: US 8,155,253 B2
(45) Date of Patent: Apr. 10, 2012

(54) APPARATUS AND METHOD FOR AUTOMATICALLY CHANGING BROADCAST CHANNEL FOR MOBILE COMMUNICATION TERMINAL ADAPTED TO RECEIVE DIGITAL MULTIMEDIA BROADCAST

(75) Inventors: Seung-Jae Han, Hwaseong-si (KR); Kyong-Joon Chun, Seoul (KR); Jin-Young Lee, Seoul (KR); Dong-Jun Kum, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 655 days.

(21) Appl. No.: 12/324,197

(22) Filed: Nov. 26, 2008

(65) Prior Publication Data
US 2009/0141838 A1  Jun. 4, 2009

(30) Foreign Application Priority Data
Nov. 27, 2007  (KR) ........................ 10-2007-0121506

(51) Int. Cl.
*H04L 27/06* (2006.01)
(52) U.S. Cl. ........................ 375/344; 375/316
(58) Field of Classification Search .................. 375/344, 375/316, 349, 347; 455/226.1, 226.2, 184.1
See application file for complete search history.

(56) References Cited

U.S. PATENT DOCUMENTS

| | | | |
|---|---|---|---|
| 6,009,331 A * | 12/1999 | Ueda ............................. | 455/450 |
| 6,711,390 B1 * | 3/2004 | Moers ......................... | 455/186.1 |
| 7,209,190 B2 * | 4/2007 | Katsube et al. ................ | 348/838 |
| 2003/0162535 A1 * | 8/2003 | Nishiyama et al. ........... | 455/422 |
| 2004/0110522 A1 * | 6/2004 | Howard et al. ................ | 455/512 |
| 2006/0181652 A1 * | 8/2006 | Hagiwara ...................... | 348/732 |
| 2007/0049332 A1 * | 3/2007 | Higuchi ...................... | 455/556.1 |
| 2007/0129020 A1 * | 6/2007 | Anton-Becker ................ | 455/78 |
| 2007/0130606 A1 * | 6/2007 | Jeong ............................ | 725/131 |
| 2007/0281730 A1 * | 12/2007 | Ichi ............................ | 455/550.1 |
| 2008/0098439 A1 * | 4/2008 | Taura et al. ..................... | 725/75 |
| 2008/0125066 A1 * | 5/2008 | Suzuki ........................ | 455/160.1 |
| 2008/0167044 A1 * | 7/2008 | Natsume ....................... | 455/437 |
| 2009/0017792 A1 * | 1/2009 | Matsumoto et al. ........ | 455/412.2 |

* cited by examiner

*Primary Examiner* — Emmanuel Bayard
(74) *Attorney, Agent, or Firm* — The Farrell Law Firm, P.C.

(57) ABSTRACT

Disclosed is an apparatus and a method for automatically changing the broadcast channel for a mobile communication terminal adapted to receive digital multimedia broadcasts. The apparatus includes a memory unit for storing an adjacent area database and an area-wise broadcast channel database; a search unit for searching for broadcast channels and receiving broadcasts; and a control unit for determining the received field strength of at least one adjacent area frequency based on the adjacent area database during digital multimedia broadcast playback, and when a predetermined threshold is exceeded, determining that a movement into a corresponding adjacent area is occurring, the control unit controlling the search unit to search through broadcast channels of the adjacent area in the area-wise broadcast channel database to find a broadcast channel identical to a broadcast channel used for playback before the movement into the adjacent area.

8 Claims, 7 Drawing Sheets

APPARATUS AND METHOD FOR AUTOMATICALLY CHANGING BROADCAST CHANNEL FOR MOBILE COMMUNICATION TERMINAL ADAPTED TO RECEIVE DIGITAL MULTIMEDIA BROADCAST

PRIORITY

This application claims priority under 35 U.S.C. §119(a) to an application entitled "Apparatus and Method for Automatically Changing Broadcast Channel for Mobile Communication Terminal Adapted to Receive Digital Multimedia Broadcast" filed in the Korean Industrial Property Office on Nov. 27, 2007 and assigned Serial No. 2007-121506, the contents of which are hereby incorporated by reference.

BACKGROUND OF THE INVENTION

1. Field of the Invention

The present invention relates to an apparatus and a method for automatically changing the channel so that, when a user is watching a terrestrial Digital Multimedia Broadcasting (DMB) program on the move, the user can watch the same program without interruption even if he/she moves between different broadcast areas.

2. Description of the Related Art

As generally known in the art, when a user watching a DMB program moves between different broadcast areas, the same program may no longer be available or broadcast of the program may be on another channel. If the user wants to keep watching the same program, the user must manually search for the channel. Even if the user has found the broadcast channel, the user cannot instantly select the previously watched channel. More particularly, the user is informed of the all of the channels available one after another so that the user can select the desired channel.

However, this method has a problem in that, if the user has moved between areas having different broadcast channels without noticing such a difference, the user cannot watch the same program any longer. Even if the user has noticed that the broadcast channel has changed, the user cannot watch the corresponding program until the user manually finds the desired broadcast channel which take time.

SUMMARY OF THE INVENTION

Accordingly, the present invention has been made to solve at least the above-mentioned problems occurring in the prior art, and the present invention provides an apparatus and a method for automatically changing the broadcast channel, so that when a user moves between different broadcast areas (i.e. areas having different channel allocation conditions) while watching a DMB program, the terminal automatically searches for the currently watched broadcast channel so that the user can watch the same program without interruption.

In accordance with an aspect of the present invention, there is provided an apparatus for automatically changing a broadcast channel for a mobile communication terminal adapted to receive digital multimedia broadcasts, the apparatus including a memory unit for storing an adjacent area database and an area-wise broadcast channel database; a search unit for searching for broadcast channels and receiving broadcasts; and a control unit for checking received field strength regarding at least one adjacent area frequency based on the adjacent area database during digital multimedia broadcast playback so that when a predetermined threshold is exceeded it is determined that a movement into a corresponding adjacent area is occurring, and the control unit controlling the search unit will search through broadcast channels of the adjacent area in the area-wise broadcast channel database to find a broadcast channel identical to a broadcast channel used for playback before the movement into the adjacent area.

In accordance with another aspect of the present invention, there is provided a method for automatically changing a broadcast channel by a mobile communication terminal adapted to receive digital multimedia broadcasts, the terminal having first and second tuners, the method including designating the first and second tuners as main and sub tuners, respectively; turning the main tuner on and checking if received field strength of the main tuner is below a first threshold; determining if an adjacent area has a broadcast channel identical to a current broadcast channel when the received field strength of the main tuner is below the first threshold; turning the sub tuner on when the adjacent area has a broadcast channel identical to the current broadcast channel, and tuning and monitoring frequencies of the identical broadcast channel of the adjacent area; designating the second and first tuners as the main and sub tuners, respectively, when the received field strength of the sub tuner is above the second threshold; and conducting retuning for channel change.

In accordance with another aspect of the present invention, there is provided a method for automatically changing a broadcast channel by a mobile communication terminal adapted to receive digital multimedia broadcasts, the method including receiving digital multimedia broadcasting signals; determining if received field strength of the digital multimedia broadcasting signals is below a first threshold; determining if an adjacent area has a broadcast channel identical to a current broadcast channel when the received field strength is below the first threshold; changing a tuning frequency to a frequency of the identical broadcast channel of the adjacent area (adjacent area frequency) when the adjacent area has a broadcast channel identical to the current broadcast channel, detecting received field strength, and retuning to the original frequency; determining if received field strength of the adjacent area frequency is above a second threshold after returning to the original frequency; and changing the tuning frequency to the adjacent area frequency when the received field strength of the adjacent area frequency is above the second threshold, and conducting retuning for channel change.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Figure 1:
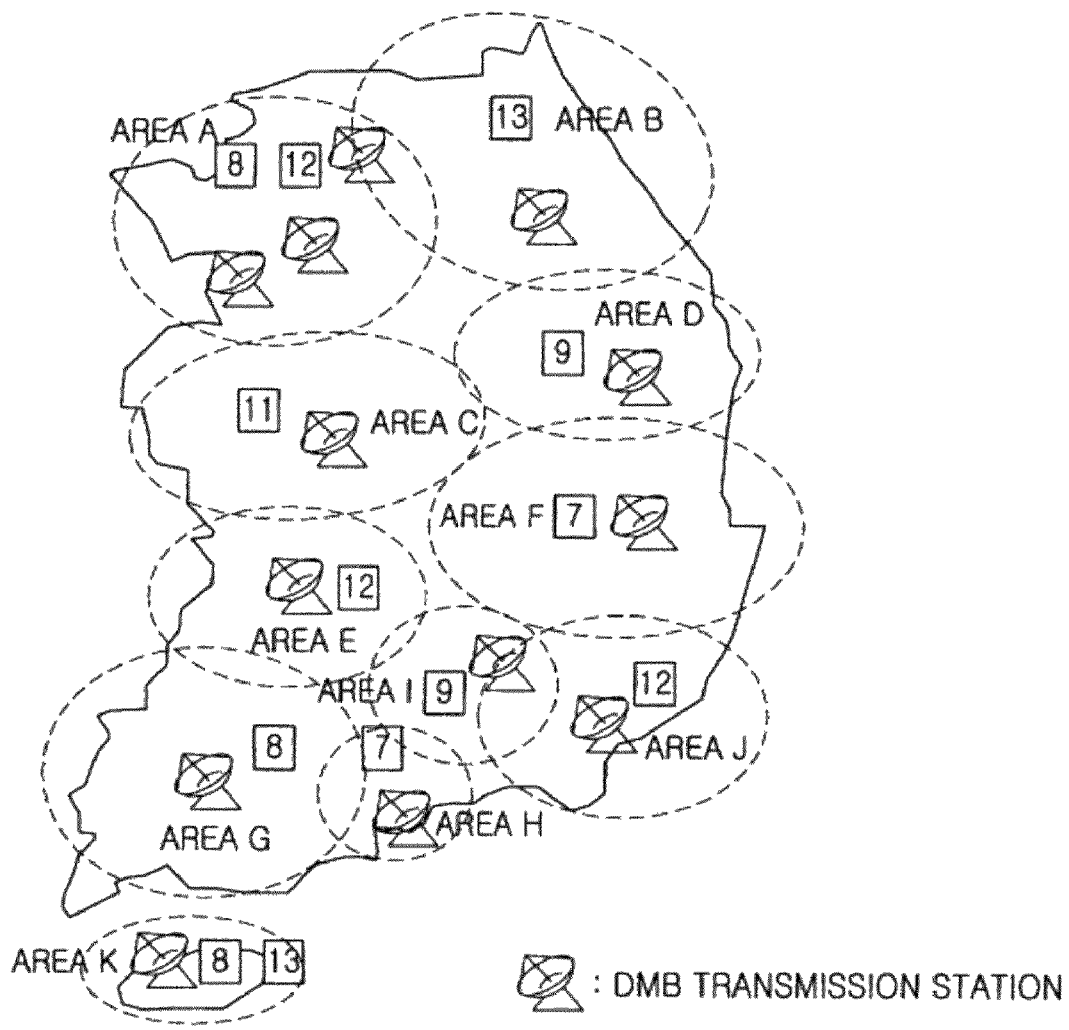
FIG. 1 illustrates a terrestrial DMB frequency allocation.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

FIG. 1 illustrates a terrestrial DMB frequency allocation.

Frequencies available in area A have classification numbers 8 and 12; frequencies available in area B have classification number 13; frequencies available in area C have classification number 11; and frequencies available in area E have classification number 12.

Figure 2:
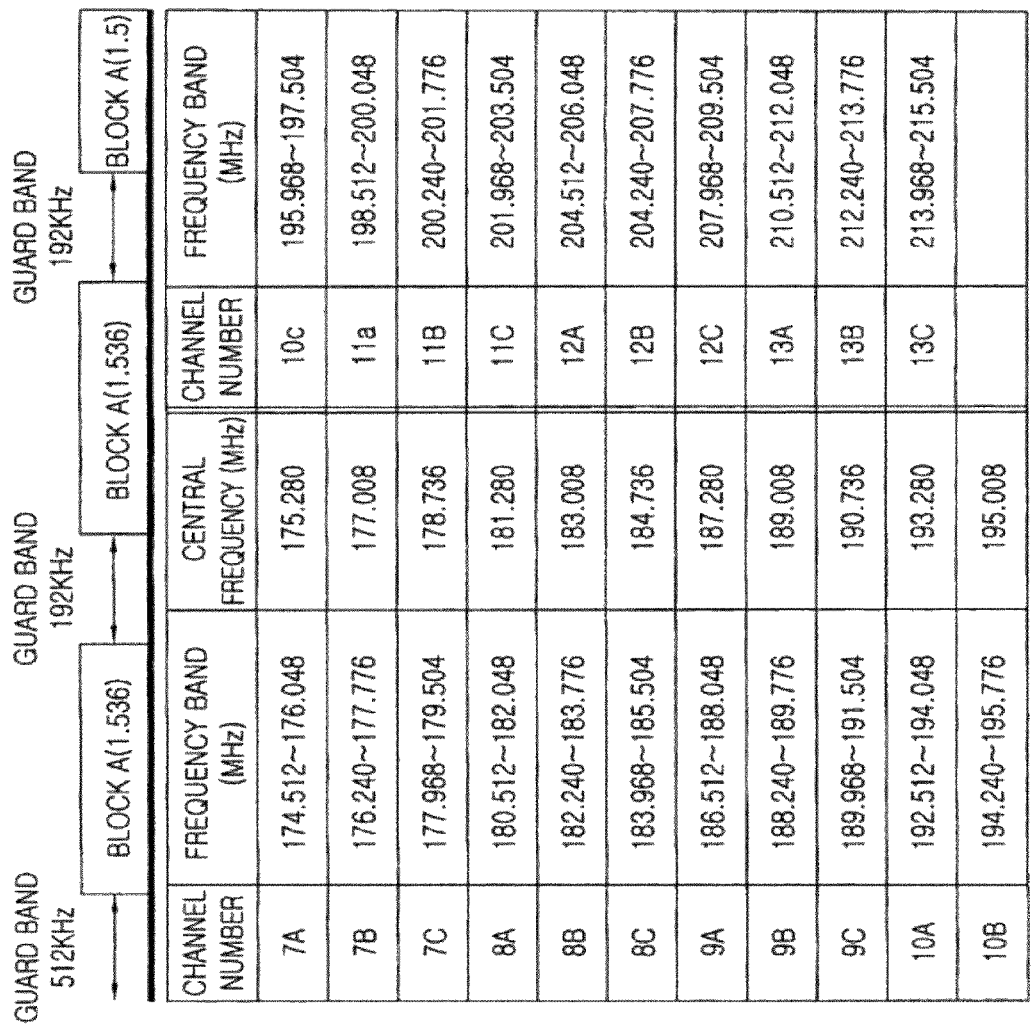
FIG. 2 illustrates exemplary frequency bands and central frequencies for respective channel numbers for terrestrial DMB.

FIG. 2 shows exemplary frequency bands and central frequencies for respective channel numbers for terrestrial DMB.

Figure 3:
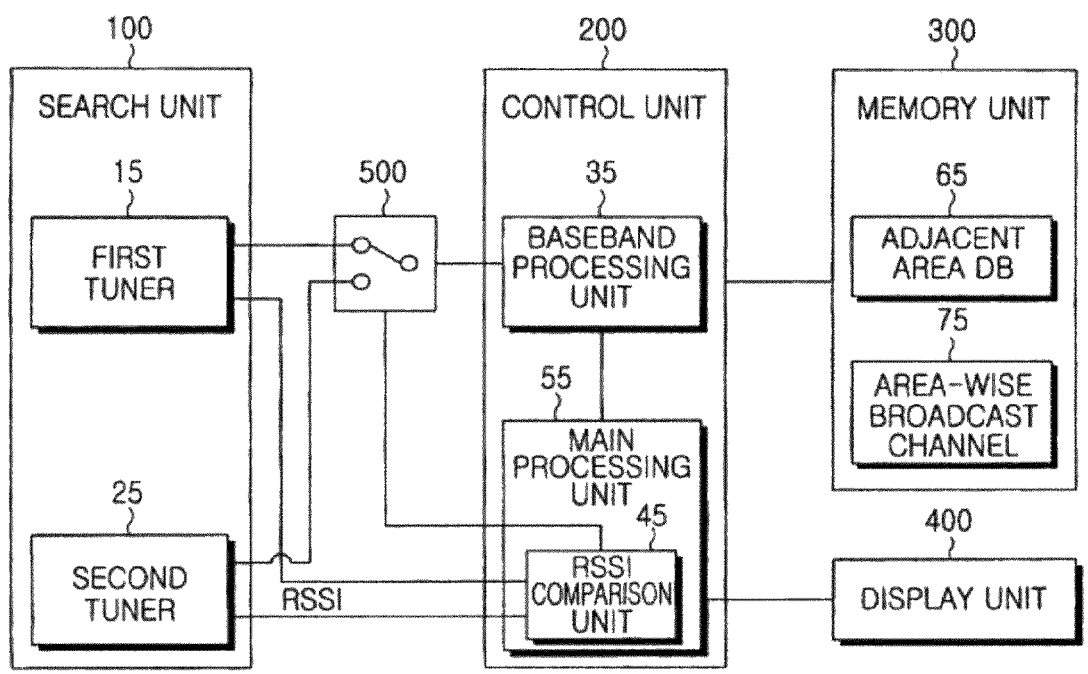
FIG. 3 is a block diagram illustrating an apparatus for automatically changing the broadcast channel for a mobile communication terminal adapted to receive digital multimedia broadcasts according to a first exemplary embodiment of the present invention.

A mobile communication terminal according to an exemplary embodiment of the present invention has information regarding central frequencies for respective terrestrial DMB blocks as shown. FIG. 3 is a block diagram of an apparatus for automatically changing the broadcast channel for a mobile communication terminal adapted to receive digital multimedia broadcasts according to a first exemplary embodiment of the present invention.

The search unit 100 is adapted to search for broadcast channels and receive broadcasts, and includes first and second tuners 15 and 25. The memory unit 300 stores an adjacent area database (DB) 65 and an area-wise broadcast channel DB 75. The control unit 200 checks the Received Signal Strength Indicator (RSSI) regarding at least one adjacent area frequency based on the adjacent area DB 65 during DMB playback. If the RSSI of an adjacent area frequency is above a predetermined threshold, it is determined that a movement into the corresponding adjacent area is occurring. The control unit 200 controls the search unit 100 to search through broadcast channels of the adjacent area, which are stored in the area-wise broadcast channel DB 75, to find a broadcast channel identical to the broadcast channel that has been used for playback before the movement into the adjacent area, so that the user can continue to watch the broadcast. The wireless signal switching unit 500 switches so that one of the first and second tuners 15 and 25 is selected as the main tuner under the control of the control unit 200. The control unit 200 controls the switching of the wireless signal switching unit 500 so that a tuner having an RSSI above a second threshold is selected as the main tuner.

The control unit 200 includes a baseband processing unit 35 and a main processing unit 55, which includes a RSSI comparison unit 45. The baseband processing unit 35 is connected to the first tuner 15 or the second tuner 25 via the wireless signal switching unit 500 to conduct baseband processing with regard to received signals. The RSSI comparison unit 45 of the main processing unit 55 detects the RSSI of signals received through the first tuner 15 and the second tuner 25, and compares them with first and second thresholds, respectively, to determine if a movement into the adjacent area has occurred. The result of determination is used to control the wireless signal switching unit 500.

The first tuner 15 is tuned to the broadcast channel currently watched by the user to receive corresponding broadcasts. In this case, the second tuner 25 conducts RSSI monitoring and searches for frequencies of adjacent area channels. If the RSSI of signals received through the first tuner 15 is less than the first threshold, and if the RSSI of signals received through the second tuner 25 is greater than the second threshold, the control unit 200 determines that the terminal has moved into the adjacent area. Then, the control unit 200 controls the wireless signal switching unit 500 so that RF signals, which are delivered to the baseband processing unit 35, are switched from signals received through the first tuner 15 to signals received through the second tuner 25. These operations are conducted automatically, and the user's intervention is unnecessary.

Figure 4:
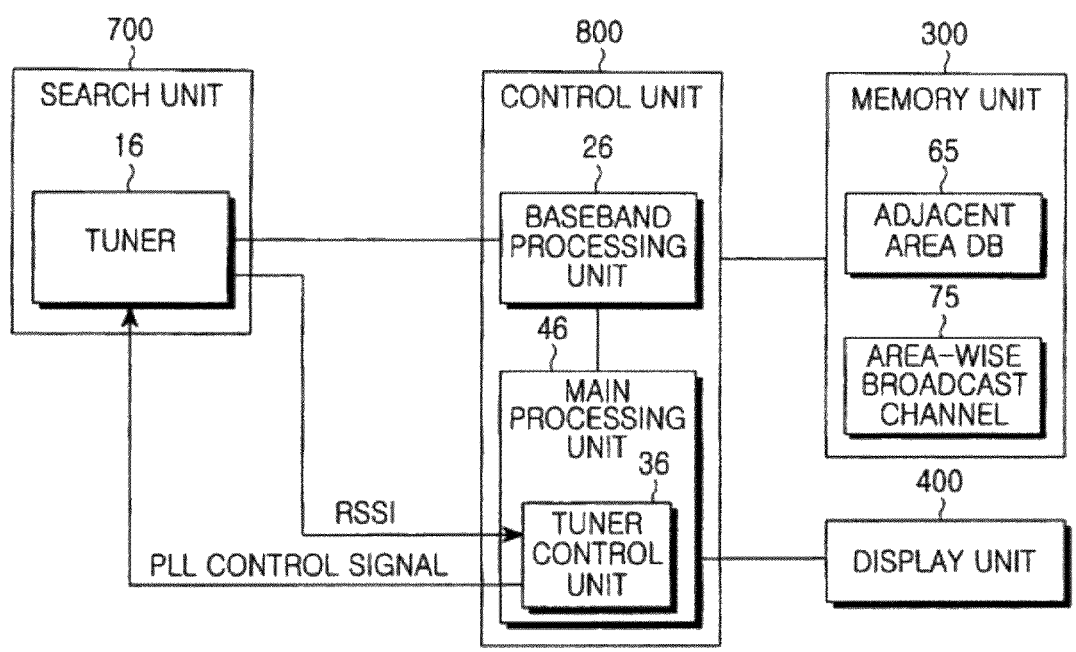
FIG. 4 is a block diagram illustrating an apparatus for automatically changing the broadcast channel for a mobile communication terminal adapted to receive digital multimedia broadcasts according to a second exemplary embodiment of the present invention.

FIG. 4 is a block diagram of an apparatus for automatically changing the broadcast channel for a mobile communication terminal adapted to receive digital multimedia broadcasts according to a second exemplary embodiment of the present invention.

The search unit 700 has a single tuner 16. The control unit 800 includes a baseband processing unit 26 and a main processing unit 46. The main processing unit 46 includes a tuner control unit 36, which may be realized by a software algorithm.

The baseband processing unit 26 is connected to the tuner 16 to conduct baseband processing with regard to received signals. The main processing unit 46 detects the RSSI of signals received through the tuner 16, and compares the RSSI with a threshold to determine if a movement into the adjacent area has occurred. Based on the result of the determination, a Phase Locked Loop (PLL) control signal is generated to control the PLL of the tuner 16.

If the RSSI of signals received through the tuner 16 is less than the threshold, the main processing unit 46 enters into a fast lock mode and adjusts the PLL of the tuner 16 within a number of milliseconds to change the tuning frequency to a different frequency. After detecting the RSSI of that time, the main processing unit 46 adjusts the PLL of the tuner 16 back to the frequency of the broadcast channel that has been watched right before the PLL had been adjusted.

As such, when the RSSI detected through the tuner 16 decreases, fast switching occurs (the tuning frequency is changed) to search for frequencies of the adjacent area, and the video stream is analyzed so that switching occurs when the last P frame arrives. As a result, the user can hardly notice any interruption of broadcasts on the screen. In general, when transmitting video data, an I frame, which includes all of the information related to an image, and a plurality of P frames, which stores only the changed information from the I frame, are repeatedly transmitted. Conventionally, there is a sudden transition between different image scenes as it goes from the last P frame to a subsequent frame following the P frame. The present invention performs the switching at the time between the last P frame and the subsequent frame. As a result, the user can hardly notice any interruption of broadcasts on the screen.

Figure 5A:
FIG. 5A illustrates an area-wise broadcast channel database according to an exemplary embodiment of the present invention.

FIG. 5A shows an area-wise broadcast channel database according to an exemplary embodiment of the present invention.

Referring to the exemplary construction of area-wise channels, broadcasting station KBS1 has channel number 8A in area A, and has channel number 13A in area B. Therefore, in order to guarantee that the user can watch the same program from KBS1 without interruption even if the user moves between areas, the broadcast channel must be automatically switched from 8A to 13A.

Figure 5B:
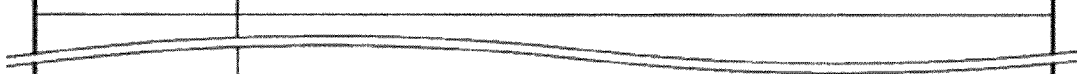
FIG. 5B illustrates an adjacent area database according to an exemplary embodiment of the present invention.

FIG. 5B shows an adjacent area database according to an exemplary embodiment of the present invention.

Referring to FIG. 5B, area A has adjacent areas of B, C, and D, and area B has adjacent areas of A, D, E, and F.

Figure 6:
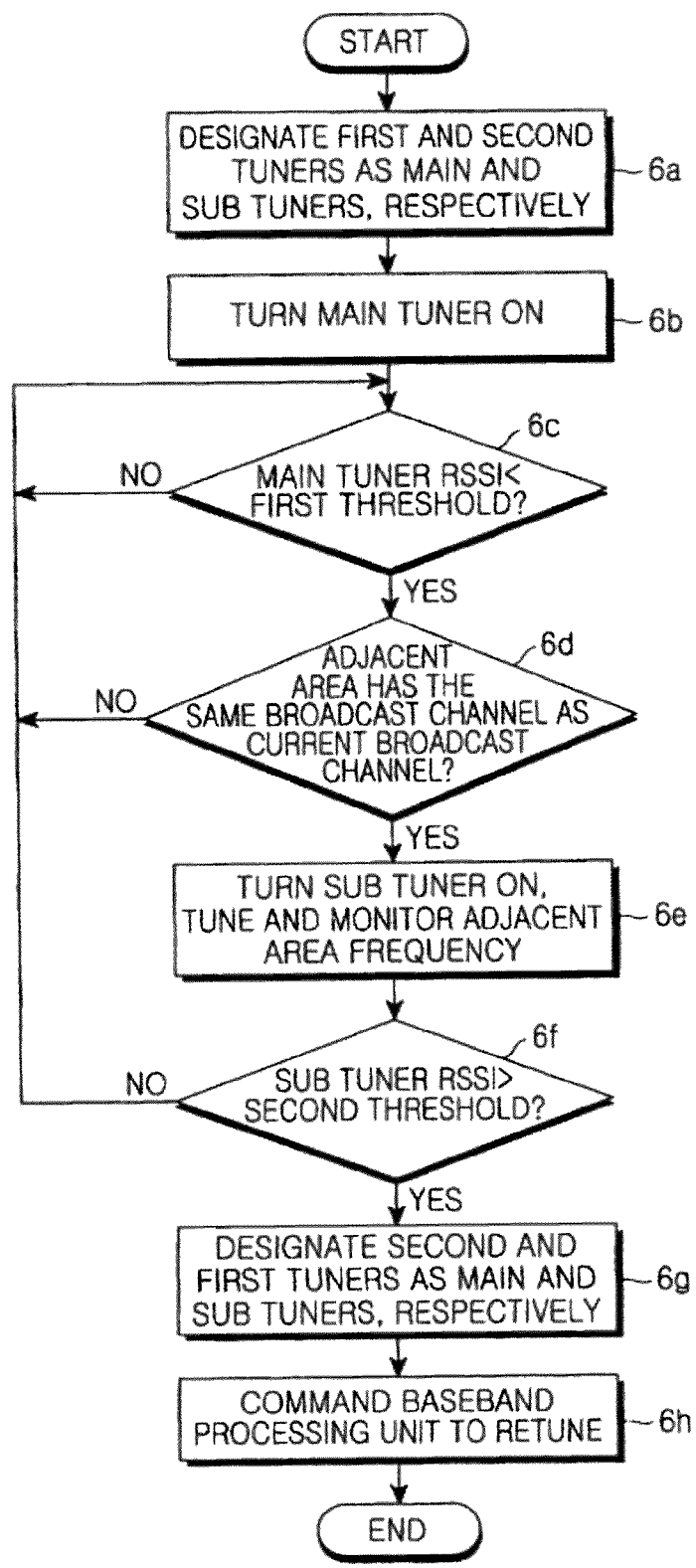
FIG. 6 is a flowchart illustrating a method for automatically changing the broadcast channel for a mobile communication terminal adapted to receive digital multimedia broadcasts according to a first exemplary embodiment of the present invention.

FIG. 6 is a flowchart showing a method for automatically changing the broadcast channel for a mobile communication terminal adapted to receive digital multimedia broadcasts according to a first exemplary embodiment of the present invention.

In step 6a, the first tuner 15 and the second tuner 25 are designated as main and sub tuners, respectively. In step 6b, the main tuner is turned on. In step 6c, the RSSI of the main tuner is compared with the first threshold. If the RSSI of the main tuner is not below the first threshold, the process returns to step 6c. If the RSSI is below the first threshold, it is determined in step 6d if the adjacent area has the same broadcast channel as the current broadcast channel with reference to the adjacent area DB 65 and the area-wise broadcast channel DB 75. If the adjacent area does not have the same broadcast channel as the current broadcast channel, the process returns to step 6c. If the adjacent area has the same broadcast channel, the sub tuner is turned on in step 6f to tune and monitor the frequency of the same broadcast channel of the adjacent area. In step 6f the RSSI of the sub tuner is compared to the second threshold. If the RSSI of the sub tuner is not above the second threshold, the process returns to step 6c. If the RSSI of the sub tuner is above the second threshold, the second tuner 25 and the first tuner 15 are designated as the main and sub tuners, respectively, in step 6g. Then, a retuning command is given to the baseband processing unit 35 in step 6h so that the channel is automatically changed.

Figure 7:
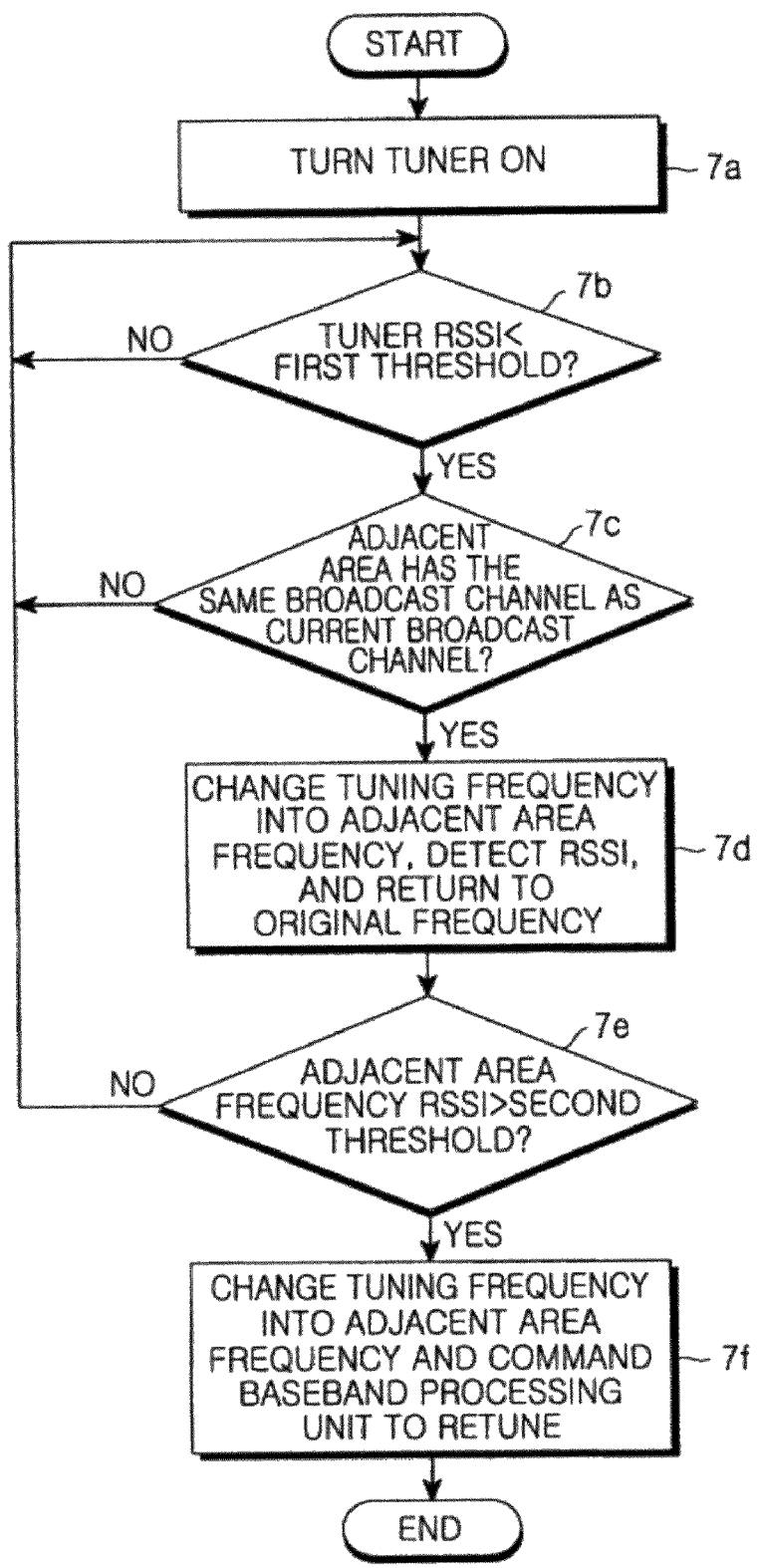
FIG. 7 is a flowchart illustrating a method for automatically changing the broadcast channel for a mobile communication terminal adapted to receive digital multimedia broadcasts according to a second exemplary embodiment of the present invention.

FIG. 7 is a flowchart showing a method for automatically changing the broadcast channel for a mobile communication terminal adapted to receive digital multimedia broadcasts according to a second exemplary embodiment of the present invention.

In step 7a, the tuner 16 is turned on to receive DMB signals. In step 7b the RSSI of signals detected through the tuner 16 is compared with the first threshold. If the RSSI is not below the first threshold, the process returns to step 7b. If the RSSI is below the first threshold, it is determined in step 7c if the adjacent area has the same broadcast channel as the current broadcast channel with reference to the adjacent area DB 65 and the area-wise broadcast channel DB 75. If the adjacent area does not have the same broadcast channel as the current broadcast channel, the process returns to step 7b. If the adjacent area has the same broadcast channel, the tuning frequency of the tuner 16 is changed to the same broadcast channel frequency of the adjacent area (adjacent area frequency) in step 7d. Then, after detecting the RSSI, the original frequency is reselected. In step 7e the RSSI of the adjacent area frequency is compared with the second threshold. If the RSSI of the adjacent area frequency is not above the second threshold, the process returns to step 7b. If the RSSI of the adjacent area frequency is above the second threshold, the tuning frequency of the tuner 16 is changed to the adjacent area frequency in step 7f, and the baseband processing unit 35 is given a retuning command so that the channel is automatically changed.

As mentioned above, the present invention is advantageous in that, when the user moves between different broadcast areas, the broadcast channel is automatically changed. This avoids any inconvenience caused by difference in frequencies of terrestrial DMB channels. Particularly, even if the user moves between areas, there is no interruption of broadcasts on the screen, and the user does not have to inconveniently search for the broadcast channel again.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for automatically changing a broadcast channel for a mobile communication terminal adapted to receive digital multimedia broadcasts, the apparatus comprising:
   a memory unit for storing an adjacent area database and an area-wise broadcast channel database;
   a search unit for searching for broadcast channels and receiving broadcasts; and
   a control unit for determining a received field strength of at least one adjacent area frequency based on the adjacent area database during digital multimedia broadcast playback, comparing the received field strength to a threshold and when the threshold is exceeded determining that a movement into a corresponding adjacent area is occurring, and controlling the search unit to search through broadcast channels of the adjacent area in the area-wise broadcast channel database to identify a broadcast channel identical to a broadcast channel used for playback before the movement into the adjacent area.

2. The apparatus as claimed in claim 1, further comprising a wireless signal switching unit, wherein the search unit comprises a first tuner and a second tuner, and the wireless signal switching unit switches so that one of the first tuner and the second tuner is selected as a main tuner under the control of the control unit.

3. The apparatus as claimed in claim 2, wherein the control unit comprises:
   a baseband processing unit connected to one of the first tuner and the second tuner of the search unit via the wireless signal switching unit to conduct baseband processing of received signals; and
   a main processing unit for detecting the received field strength of signals received from the first tuner and the second tuner, comparing the received field strength with a first threshold and a second threshold, respectively, to determine if a movement into the adjacent area has occurred, and controlling the wireless switching unit according to the determination result.

4. The apparatus as claimed in claim 3, wherein the main processing unit is adapted to determine that a movement into the adjacent area has occurred when the received field strength of signals received from the first tuner is less than the first threshold and when the received field strength of signals received from the second tuner is greater than the second threshold.

5. The apparatus as claimed in claim 1, wherein the search unit includes a single tuner, and the control unit comprises:

a baseband processing unit connected to the tuner to conduct baseband processing with regard to the received signals; and a main processing unit for detecting the received field strength of signals received from the tuner, comparing the field strength with a threshold to determine if a movement into the adjacent area has occurred, and generating a phase locked loop control signal according to the determination result to control a phase locked loop of the tuner.

6. The apparatus as claimed in claim 5, wherein when received field strength of signals received from the tuner is less than the threshold, the main processing unit adjusts the phase locked loop of the tuner to a different frequency in a fast lock mode, detects the received field strength during the adjustment, and adjusts the phase locked loop of the tuner back to a frequency of the current channel.

7. A method for automatically changing a broadcast channel by a mobile communication terminal adapted to receive digital multimedia broadcasts, the terminal having a first tuner and a second tuner, the method comprising the steps of:

designating the first tuner as a main tuner and designating the second tuner as a sub tuner;

turning on the main tuner and determining if a received field strength of the main tuner is less than a first threshold;

determining if an adjacent area has a broadcast channel identical to a current broadcast channel when the received field strength of the main tuner is less than the first threshold;

turning on the sub tuner when the adjacent area has a broadcast channel identical to the current broadcast channel, and tuning and monitoring frequencies of the identical broadcast channel of the adjacent area; and designating the second tuner as the main tuner and the first tuner as the sub tuner when the received field strength of the sub tuner is greater than the second threshold, and conducting retuning for channel change.

8. A method for automatically changing a broadcast channel by a mobile communication terminal adapted to receive digital multimedia broadcasts, the method comprising the steps of:

receiving, by the mobile terminal, digital multimedia broadcasting signals;

determining if a received field strength of the digital multimedia broadcasting signals is less than a first threshold;

determining if an adjacent area has a broadcast channel identical to a current broadcast channel when the received field strength is less than the first threshold;

changing a tuning frequency to a frequency of the identical broadcast channel of the adjacent area when the adjacent area has a broadcast channel identical to the current broadcast channel, detecting the received field strength, and retuning to the original frequency;

determining if the received field strength of the adjacent area frequency is greater than a second threshold after returning to the original frequency; and changing the tuning frequency to the adjacent area frequency when the received field strength of the adjacent area frequency is greater than the second threshold, and conducting retuning for channel change.

* * * * *